United States Patent
Jones et al.

(10) Patent No.: US 6,842,995 B2
(45) Date of Patent: Jan. 18, 2005

(54) METHODS AND APPARATUS FOR ALIGNING COMPONENTS FOR INSPECTION

(75) Inventors: Daniel Edward Jones, Hamilton, OH (US); Jacques Juneau, Amelia, OH (US)

(73) Assignee: General Electric Company, Schenectady, NY (US)

( * ) Notice: Subject to any disclaimer, the term of this patent is extended or adjusted under 35 U.S.C. 154(b) by 152 days.

(21) Appl. No.: 10/267,230

(22) Filed: Oct. 9, 2002

(65) Prior Publication Data

US 2004/0068884 A1 Apr. 15, 2004

(51) Int. Cl.[7] .............................................. G01D 21/00
(52) U.S. Cl. .......................... 33/645; 33/568; 33/613; 33/549
(58) Field of Search ..................... 33/573, 568, 613, 33/645, 600, 530, 549–555, 555.1

(56) References Cited

U.S. PATENT DOCUMENTS

| | | |
|---|---|---|
| 4,071,820 A | 1/1978 | Mushinsky |
| 4,437,213 A | 3/1984 | Reese et al. |
| 4,553,335 A * | 11/1985 | Woyton ........................ 33/645 |
| 5,513,539 A | 5/1996 | McLaughlin et al. |
| 5,896,672 A * | 4/1999 | Harris .......................... 33/645 |
| 5,914,055 A | 6/1999 | Roberts et al. |
| 6,068,541 A * | 5/2000 | Dwyer ......................... 451/28 |
| 6,073,360 A * | 6/2000 | Struble ......................... 33/783 |
| 6,179,567 B1 | 1/2001 | Stauffer et al. |
| 6,409,471 B1 | 6/2002 | Stow |
| 6,427,353 B1 * | 8/2002 | Nelson et al. ................ 33/552 |
| 6,467,339 B1 | 10/2002 | Descoteaux et al. |
| 6,519,864 B1 * | 2/2003 | Jones et al. ................... 33/572 |

* cited by examiner

*Primary Examiner*—Christopher W. Fulton
*Assistant Examiner*—Yaritza Guadalupe
(74) *Attorney, Agent, or Firm*—William Scott Andes; Armstrong Teasdale LLP

(57) ABSTRACT

A method for aligning a component including at least a first and a second datum for inspection. The method includes providing a tool including a fixture having at least a first and a second datum locator, aligning the first datum with the first datum locator, and rotating the component about the first datum to align the second datum with the second datum locator.

18 Claims, 4 Drawing Sheets

METHODS AND APPARATUS FOR ALIGNING COMPONENTS FOR INSPECTION

BACKGROUND OF THE INVENTION

This invention relates generally to inspection techniques, and more specifically to methods and apparatus for aligning components for inspection.

Accurately measuring a surface of a component may be a significant factor in determining a manufacturing time of the component, as well in determining subsequent maintenance and repair costs and activities. Specifically, when the component is a gas turbine engine blade, accurately measuring the contour of the blade may be one of the most significant factors affecting an overall cost of fabrication of the gas turbine engine, as well as subsequent modifications, repairs, and inspections of the blade. For example, at least some known gas turbine engine blades include a tip shroud that for performance reasons requires an accurately machined radius along the tip and center section of the blade. At least some known fabrication systems establish the radius using a system of datums referenced about the profile of the blade.

At least some known inspection processes use coordinate measuring machines (CMMs) to obtain dimensional information for a component. Within at least some CMMS, the component is held within a three-coordinate measurement space such that one or more datums are exposed to the CMM. A CMM probe is also positioned within the three-coordinate measurement space and contacts one or more of the datums, at which time a position of the probe tip is measured. The process must be repeated many times to determine a surface contour of the component, and as such, using a CMM may be time-intensive, and result in high cycle times and costs. Furthermore, it may be difficult to align the components in a position that facilitates accurate inspection of the component without distorting the profile and/or features of the component.

BRIEF DESCRIPTION OF THE INVENTION

In one aspect, a method is provided for aligning a component including at least a first and a second datum for inspection. The method includes providing a tool including a fixture having at least a first and a second datum locator, aligning the first datum with the first datum locator, and rotating the component about the first datum to align the second datum with the second datum locator.

In another aspect, a tool is provided including a fixture, a first datum locator coupled to the fixture, and a first biasing mechanism fixedly coupled to the fixture for biasing a component such that the component is aligned with respect to the first datum locator.

In yet another aspect, an apparatus is provided for aligning a gas turbine engine blade. The apparatus includes a fixture, a first datum locator coupled to the fixture, a second datum locator coupled to the fixture, and a first biasing mechanism fixedly coupled to the fixture. The first biasing mechanism biases the gas turbine engine blade such that the gas turbine engine blade rotates about the first datum locator.

DETAILED DESCRIPTION OF THE INVENTION

As used herein, the terms "inspection" and "inspecting" may include any inspection process. For example, inspection processes may include measurement by a machine, measurement by humans, visual inspection by a machine, and/or visual inspection by a human. The above examples are intended as exemplary only, and thus are not intended to limit in any way the definition and/or meaning of the terms "inspection" and "inspecting". In addition, as used herein the term "component" may include any object to which an inspection process is applied. Furthermore, although the invention is described herein in association with a gas turbine engine, and more specifically for use with a turbine blade for a gas turbine engine, it should be understood that the present invention may be applicable to any component and/or any inspection process. Accordingly, practice of the present invention is not limited to the inspection of turbine blades or other components of gas turbine engines.

Figure 1:
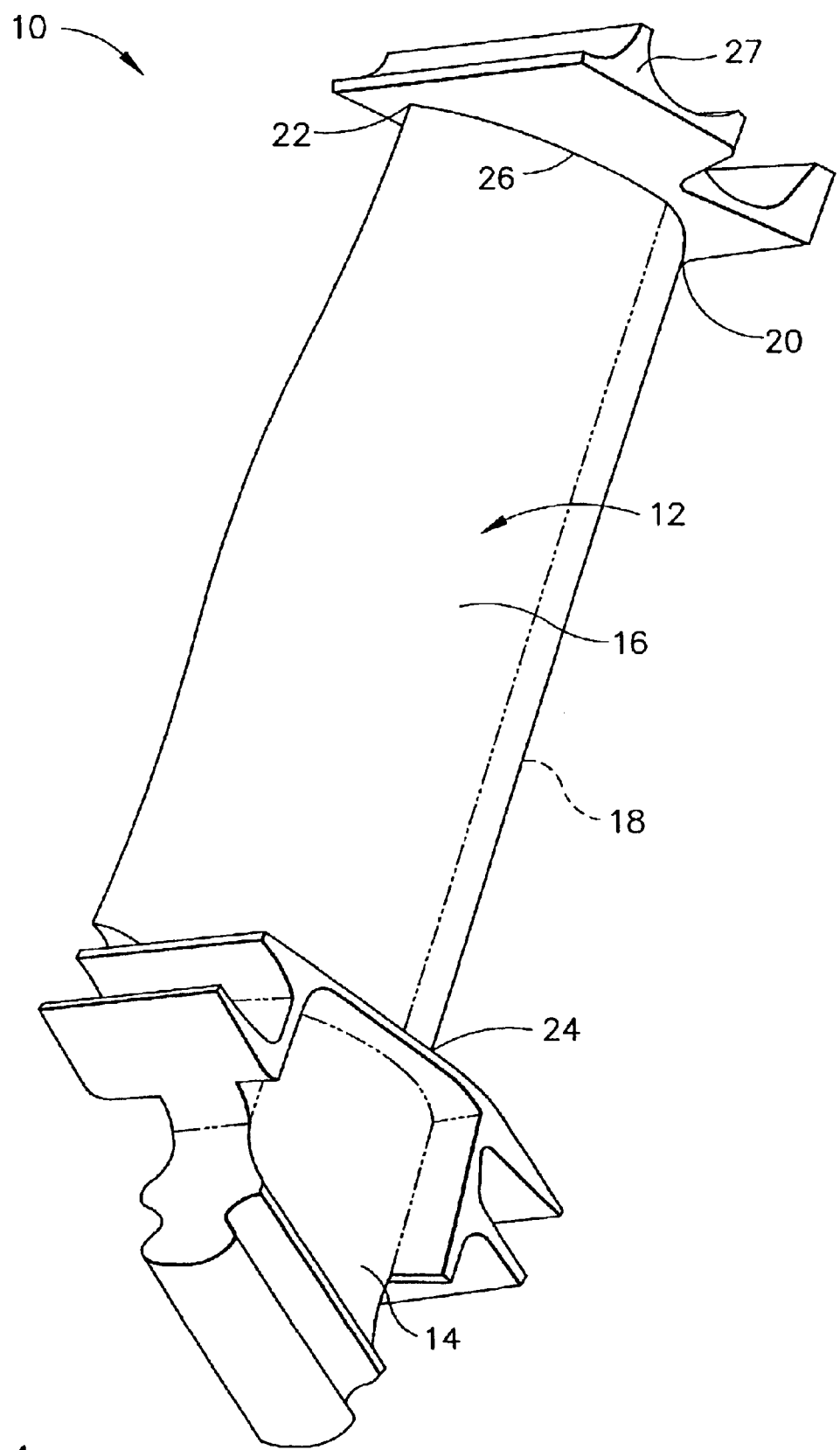
FIG. 1 is a perspective view of an exemplary gas turbine engine blade.

FIG. 1 is a perspective view of a turbine blade 10 that may be used with a gas turbine engine (not shown). In one embodiment, a plurality of turbine blades 10 form a high-pressure turbine rotor blade stage (not shown) of the gas turbine engine. Each blade 10 includes a hollow airfoil 12 and an integral dovetail 14 that is used for mounting airfoil 12 to a rotor disk (not shown) in a known manner. Alternatively, blades 10 may extend radially outwardly from a disk (not shown), such that a plurality of blades 10 form a blisk (not shown).

Each airfoil 12 includes a first contoured sidewall 16 and a second contoured sidewall 18. First sidewall 16 is convex and defines a suction side of airfoil 12, and second sidewall 18 is concave and defines a pressure side of airfoil 12. Sidewalls 16 and 18 are joined at a leading edge 20 and at an axially-spaced trailing edge 22 of airfoil 12. More specifically, airfoil trailing edge 22 is spaced chordwise and downstream from airfoil leading edge 20. First and second sidewalls 16 and 18, respectively, extend longitudinally or radially outward in span from a blade root 24 positioned adjacent dovetail 14, to an airfoil tip 26. In one embodiment, airfoil tip 26 includes a tip shroud (not shown) extending radially outward therefrom in a direction away from airfoil 12.

Figure 2:
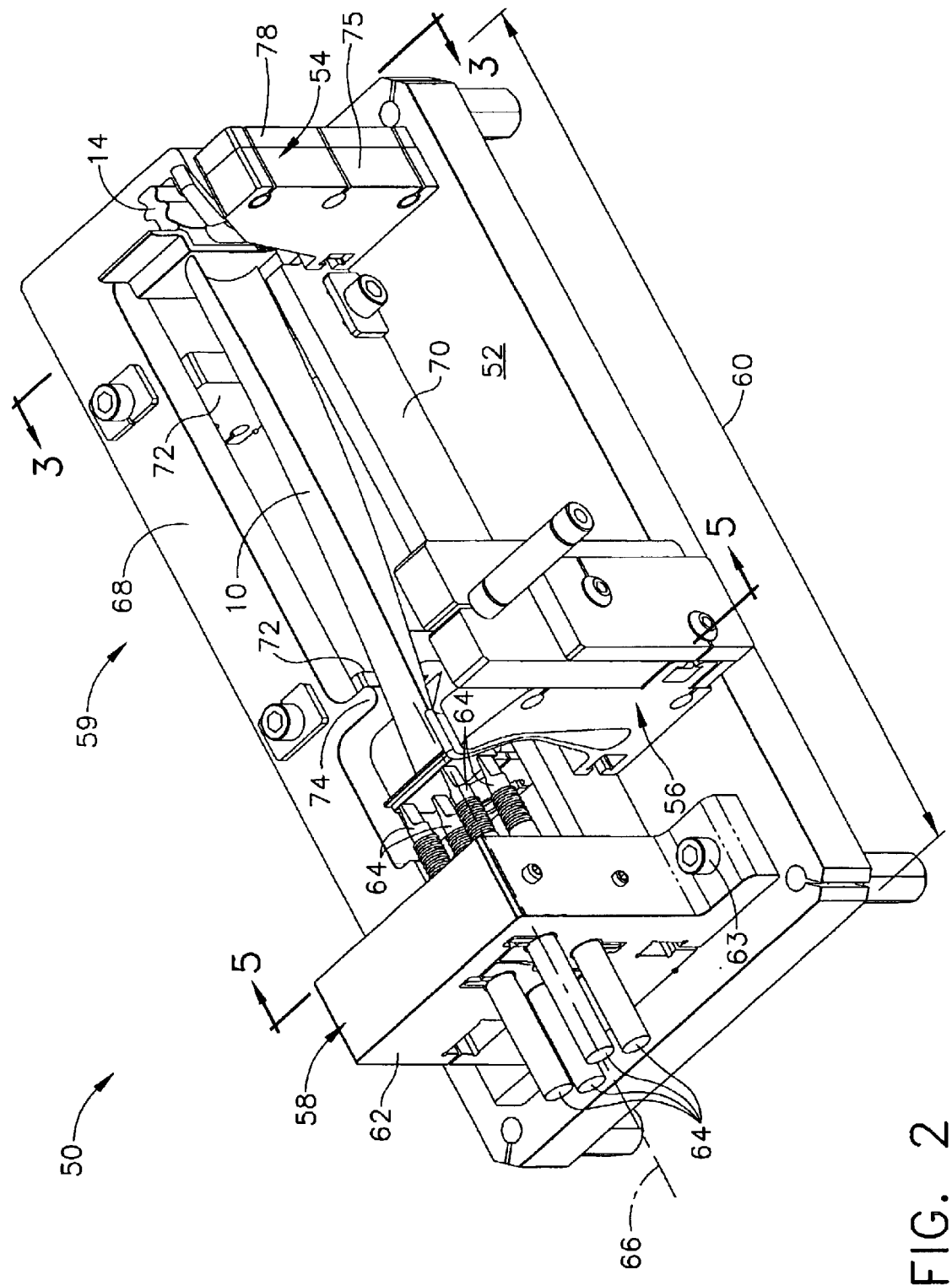
FIG. 2 is a perspective view of a fixture assembly for aligning a component, such as the gas turbine engine blade shown in FIG. 1, in position during inspection.

FIG. 2 is a perspective view of a fixture assembly 50 for aligning turbine blade 10 in position during inspection. Fixture assembly 50 includes a fixture 52 used for inspection processes, a dovetail alignment mechanism 54 coupled to fixture 52, a tip shroud alignment mechanism 56 coupled to fixture 52, a measuring assembly 58 coupled to fixture 52, and a support assembly 59. Dovetail alignment mechanism 54, tip shroud alignment mechanism 56, measuring assembly 58, and support assembly 59 are coupled to fixture 52 using any suitable coupling means. For example, in one embodiment, at least one of dovetail alignment mechanism 54, tip shroud alignment mechanism 56, measuring assembly 58, and support assembly 59 is coupled to fixture 52 using threaded bolts and threaded nuts. In another embodiment, at least one of dovetail alignment mechanism 54, tip shroud alignment mechanism 56, measuring assembly 58, and support assembly 59 is coupled to fixture 52 using threaded bolts and threaded openings in fixture 52. Prior to undergoing an inspection process, a turbine blade 10 is positioned in fixture assembly 50.

In the exemplary embodiment, measuring assembly 58 includes a fixed retainer 62 fixedly coupled to fixture 52 and a linear variable differential transformer device (LVDT) 64. Fixed retainer 62 is fixedly coupled to fixture 52 using any suitable means. For example, in the exemplary embodiment fixed retainer 62 is coupled to fixture 52 using threaded bolts and threaded nuts 63. In another embodiment, fixed retainer 62 is coupled to fixture 52 using threaded bolts and threaded openings in fixture 52. LVDT 64 is slidably coupled to fixed retainer 62 along a measuring axis 66 using any suitable means such that LVDT 64 moves within, and with respect to, fixed retainer 62 along measuring axis 66.

Support assembly 59 includes an integrator 68, a support plate 70, and a plurality of support members 72. Support members 72 are coupled to fixture 52, integrator 68, and support plate 70. Support members 72 extend outwardly from fixture 52 to integrator 68, thereby supporting integrator 68. As discussed above, with respect to support assembly 59, support members 72 are coupled to fixture 52, integrator 68, and support plate 70 using any suitable means. In the exemplary embodiment, support members 72 are coupled to fixture 52, integrator 68, and support plate 70 using threaded bolts and threaded openings in at least one of fixture 52 and support members 72. Integrator 68 includes a stop 74, discussed in more detail below.

Dovetail alignment mechanism 54 includes a biasing mechanism mount 75 used for mounting a biasing mechanism (shown in FIG. 3) thereto. Using the biasing mechanism, dovetail alignment mechanism 54 aligns blade dovetail 14 such that dovetail 14 is maintained in position with respect to fixture 52 to facilitate an accurate inspection of blade 10. Tip shroud alignment mechanism 56 aligns blade tip shroud 27 such that tip shroud 27 is maintained in position with respect to fixture 52 to facilitate an accurate inspection of blade 10. Accordingly, the combination of dovetail alignment mechanism 54 and tip shroud alignment mechanism 56 facilitates aligning blade 10 in a position with respect to fixture 52 to facilitate an accurate inspection of blade 10. When blade 10 is loaded into fixture assembly 50, LVDT 64 contacts at least one target datum point located on blade tip shroud 27. More specifically, at least a portion of LVDT 64 is displaced along axis 66 by each respective target datum point. The displacement of LVDT 64 is then measured to determine the locations of the target datums.

Figure 4:
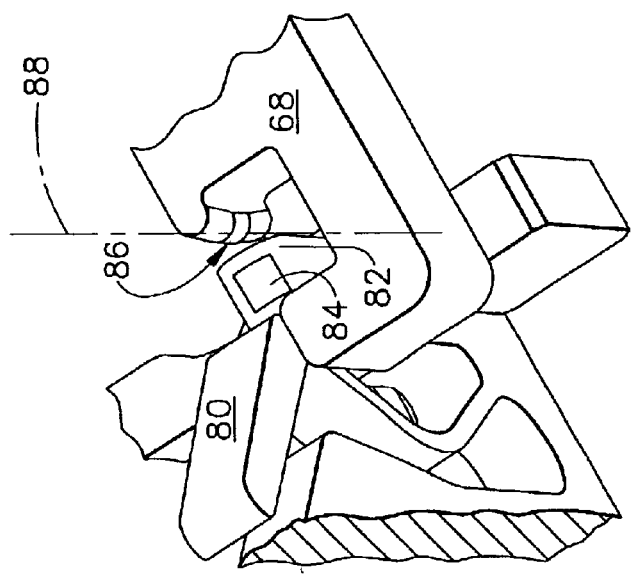
FIG. 4 is a perspective view of a portion of the dovetail alignment mechanism shown in FIGS. 2 and 3, and an integrator.
Figure 3:
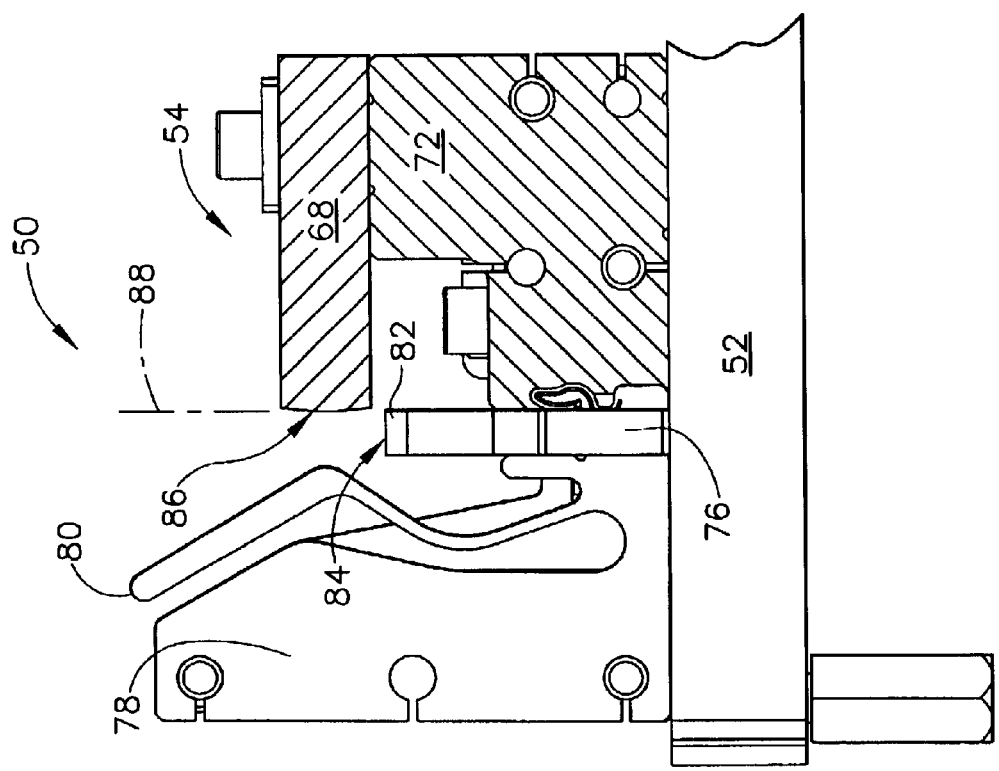
FIG. 3 is a side view of the fixture assembly shown in FIG. 2 and showing a dovetail alignment mechanism.

FIG. 3 is a side view of fixture assembly 50 showing dovetail alignment mechanism 54. FIG. 4 is a perspective view of a portion of dovetail alignment mechanism 54 and integrator 68. Dovetail alignment mechanism 54 includes a datum locator base 76 that is coupled to fixture 52, and a biasing mechanism base 78 that is coupled to biasing mechanism mount 75 (shown in FIG. 2). Biasing mechanism base 78 is coupled to biasing mechanism mount 75 using any suitable means, for example threaded bolts and threaded openings. As discussed above with respect to dovetail alignment mechanism 54, datum locator base 76 and biasing mechanism mount 75 are coupled to fixture 52 using any suitable means. In the exemplary embodiment, datum locator base 76 and biasing mechanism mount 75 are coupled to fixture 52 using threaded bolts and threaded openings in at least one of fixture 52, datum locator base 76, and biasing mechanism mount 75. Biasing mechanism base 78 includes a biasing mechanism 80. In the exemplary embodiment, biasing mechanism 80 is integrally formed with biasing mechanism base 78. However, in an alternative embodiment, biasing mechanism 80 is a separate component coupled to biasing mechanism base 78 using any suitable means. Furthermore, and in one embodiment, biasing mechanism 80 is a spring such as, but not limited to a helical spring, a plate spring, or a leaf spring. In the exemplary embodiment, at least a portion of biasing mechanism 80 is received within at least portion of dovetail 14. In an alternative embodiment (not shown), at least a portion of dovetail 14 is received within at least a portion of biasing mechanism 80.

Datum locator base 76 includes an upper surface 82 that at least partially defines a first datum locator 84 used to facilitate locating a first datum on blade 10, and more specifically dovetail 14. In one embodiment, first datum locator 84 is substantially planar. In addition, integrator 68 includes a second datum locator 86 used to facilitate locating a second datum on blade 10, and more specifically dovetail 14. Second datum locator 86 enables blade 10 to rotate about second datum locator 86, and more specifically second datum rotational axis 88, while the second datum is aligned with respect to second datum locator 86. In the exemplary embodiment, second datum locator 86 is at least partially a convex surface and is integrally formed with integrator 68. In an alternative embodiment, second datum locator 86 is a separate component that is coupled to integrator 68 in any suitable manner. Furthermore, in another alternative embodiment, second datum locator 86 is integrally formed with, or coupled to, a portion of dovetail alignment mechanism 54 or fixture 52, rather than integrator 68.

Figure 5:
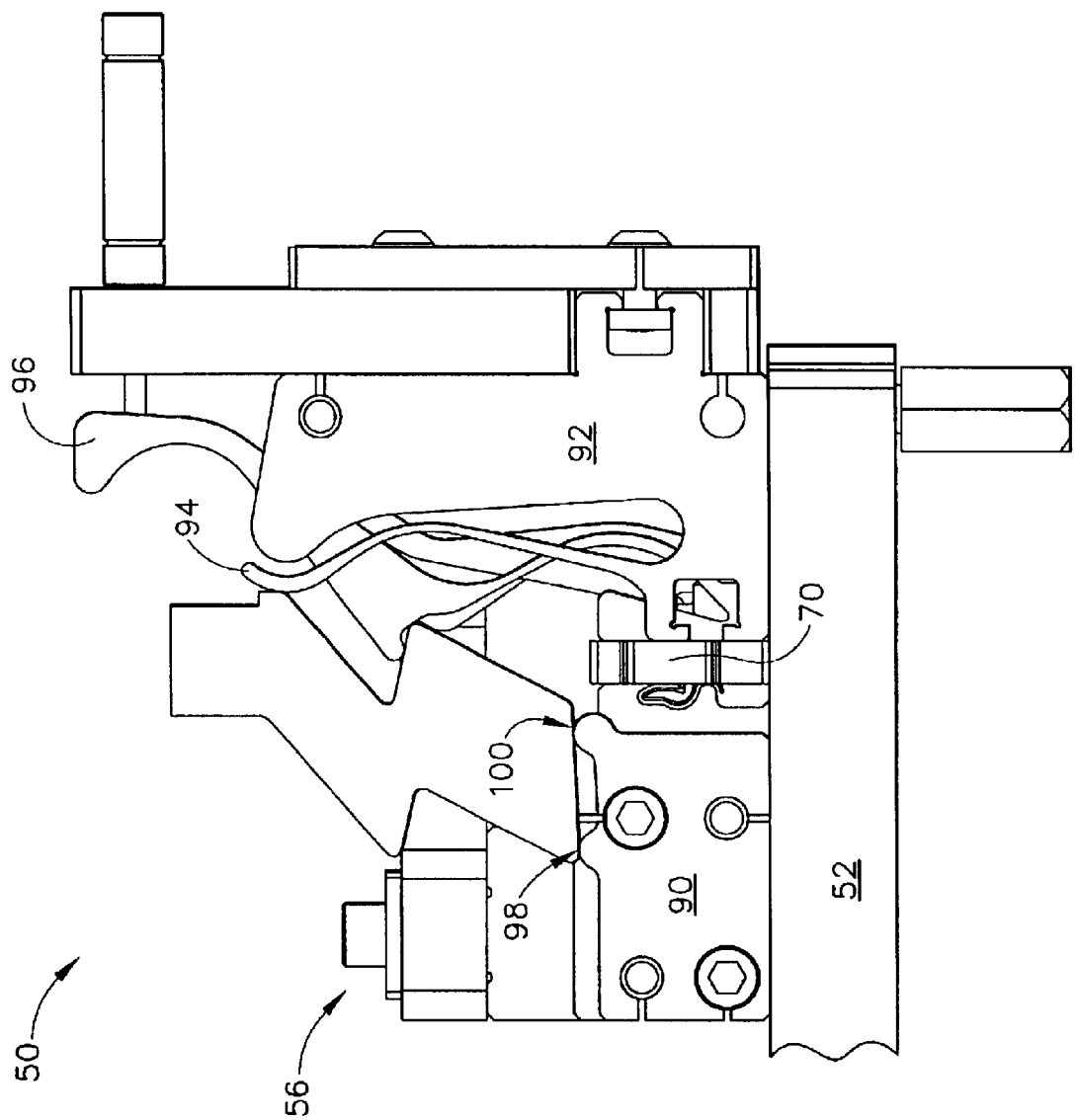
FIG. 5 is a cross-sectional view of the fixture assembly shown in FIG. 2 taken alone line 5—5 and illustrating a tip shroud alignment mechanism.

FIG. 5 is a cross-sectional view of fixture assembly 50 taken along line 5—5 of FIG. 2 and illustrating tip shroud alignment mechanism 56. Tip shroud alignment mechanism 56 includes a datum locator base 90 that is coupled to fixture 52, and a biasing mechanism base 92 that is coupled to fixture 52. As discussed above with respect to tip shroud alignment mechanism 56, datum locator base 90 and biasing mechanism base 92 are coupled to fixture 52 using any suitable means. In the exemplary embodiment, datum locator base 90 and biasing mechanism base 92 are coupled to fixture 52 using threaded bolts and threaded openings in at least one of fixture 52, datum locator base 90, and biasing mechanism base 92.

Biasing mechanism base 92 includes a first biasing mechanism 94 and a second biasing mechanism 96. In the exemplary embodiment, at least a portion of a second biasing mechanism 96 is received within at least a portion of blade tip shroud 27. In an alternative embodiment, at least a portion of blade tip shroud 27 is received within at least a portion of second biasing mechanism 96. Furthermore, and in one embodiment, a portion of first biasing mechanism 94 is received within at least a portion of blade tip shroud 27. In an alternative embodiment, at least a portion of blade tip shroud 27 is received within at least a portion of first biasing mechanism 94. In the exemplary embodiment, first biasing mechanism 94 and second biasing mechanism 96 are integrally-formed with biasing mechanism base 92, however, it should be understood that first biasing mechanism 94 and second biasing mechanism 96 may be coupled to, or formed with, biasing mechanism base 92 in any suitable manner. In an alternative embodiment, first biasing mechanism 94 is coupled to, or integrally-formed with, a different biasing mechanism base than second biasing mechanism 96. In addition, and in another alternative embodiment, tip shroud alignment mechanism 56 includes only one biasing mechanism. Furthermore, and in one embodiment, at least one of the biasing mechanisms 94 or 96 is a spring, such as but not limited to a helical spring, a plate spring, or a leaf spring.

Datum locator base 90 includes a third datum locator 98 used to facilitate locating a third datum on blade 10, and more specifically blade tip shroud 27. In addition, datum locator base 90 includes a fourth datum locator 100 used to facilitate locating a fourth datum on blade 10, and more specifically blade tip shroud 27. In one embodiment, at least one of datum locator 98 or 100 is substantially planar. In the exemplary embodiment, third datum locator 98 and fourth datum locator 100 are both integrally-formed with datum locator base 90. However, in an alternative embodiment at least one of third datum locator 98 and fourth datum locator 100 is a separate component coupled to datum locator base 90 in any suitable manner.

When blade 10 is loaded into fixture assembly 50, and more specifically when dovetail 14 is loaded into dovetail alignment mechanism 54, biasing mechanism 80 deforms such that a portion of biasing mechanism 80 is received within a portion of dovetail 14. More specifically, biasing mechanism 80 biases dovetail 14 against first datum locator 84 and second datum locator 86 causing the first datum of blade 10 to contact first datum locator 84 and the second datum of blade 10 to contact second datum locator 86, which facilitates aligning the first and second datums with first datum locator 84 and second datum locator 86, respectively. Dovetail 14 then contacts first datum locator 84 and is positioned against second datum locator 86.

When blade tip shroud 27 is loaded into tip shroud alignment mechanism 56, second biasing mechanism 96 deforms such that a portion of second biasing mechanism 96 is received within a portion of blade tip shroud 27. First biasing mechanism 94 and second biasing mechanism 96 bias blade tip shroud 27 to rotate blade 10 about second datum locator 86, and more specifically second datum rotational axis 88, from an 'unaligned' position (not shown) to an 'aligned' position (shown in FIGS. 2 and 5). More specifically, first biasing mechanism 94 biases blade tip shroud 27 against stop 74, and second biasing mechanism 96 biases blade tip shroud 27 against third datum locator 98 and fourth datum locator 100. In one embodiment, second biasing mechanism 96 facilitates biasing blade tip shroud 27 against stop 74. In another embodiment, a pneumatic system (not shown) facilitates biasing blade tip shroud 27 against stop 74 and applies pressure to blade tip shroud 27 to bias blade tip shroud 27 against stop 74 during inspection of blade 10.

In one embodiment, only one of first biasing mechanism 94 and second biasing mechanism 96 bias tip shroud 27 of blade 10 to rotate blade 10 from the 'unaligned' position to the 'aligned' position. In the 'unaligned' position, the first and second datums contact, and are aligned with, first datum locator 84 and second datum locator 86, respectively, and the third and fourth datums of blade 10 do not contact, and are not aligned with, third datum locator 98 and fourth datum locator 100, respectively. In the 'aligned' position, the first and second datums contact, and are aligned with, first datum locator 84 and second datum locator 86, respectively, and the third and fourth datums contact, and are aligned with, third datum locator 98 and fourth datum locator 100, respectively. When in the 'aligned' position dovetail 14 is positioned against first datum locator 84 and against second datum locator 86, and tip shroud 27 of blade 10 is positioned against third datum locator 98 and fourth datum locator 100. Support plate stop 74 prevents blade 10 from rotating about second datum locator 86 and axis 88 past the 'aligned' position. Once in the 'aligned' position, biasing mechanisms 80, 94, and 96 facilitate maintaining blade 10 in the 'aligned' position without distorting the profile and/or features of blade 10. In one embodiment, at least a portion of LVDT 64 is slidably engageable with a portion of tip shroud 27 of blade 10 such that LVDT 64 facilitates aligning the third and fourth datums with third datum locator 98 and fourth datum locator 100, respectively, during rotation of blade 10 from the 'unaligned' position to the 'aligned' position.

When blade 10 is in the 'aligned' position, dovetail 14 and tip shroud 27 of blade 10 are aligned in a position with respect to fixture assembly 50 that facilitates accurate inspection of blade 10 without distortion of the profile and/or features of blade 10. More specifically, when blade 10 is in the 'aligned' position, at least a portion of LVDT 64 contacts a target datum on tip shroud 27 of blade 10 different from the third and fourth datums. The target datums displace at least a portion of LVDT 64 along axis 66. Using the displacement of LVDT 64, the locations of the target datums can then be determined and compared to desired locations for the respective target datums.

The above-described tool is cost-effective, highly reliable, and highly accurate for aligning a component during inspection. The tool permits a blade dovetail and a tip shroud to be accurately aligned during inspection. More specifically, the tool aligns the blade dovetail and tip shroud in a position facilitating accurate inspection of blade 10 without distorting the profile and/or features of the blade. Because the blade may be self-aligned once coupled to the tool, the tool requires minimal input from an operator and the cycle time is greatly reduced. As a result, the tool facilitates reducing inspection costs in a cost-effective and reliable manner.

Exemplary embodiments of tool assemblies are described above in detail. The systems are not limited to the specific embodiments described herein, but rather, components of each assembly may be utilized independently and separately from other components described herein. Each tool assembly component can also be used in combination with other tool assembly components.

While the invention has been described in terms of various specific embodiments, those skilled in the art will recognize that the invention can be practiced with modification within the spirit and scope of the claims.

What is claimed is:

1. A method for aligning a component including at least a first a second, and a third datum for inspection, said method comprising:

providing a tool including a fixture having at least a first and a second datum locator, a first and second biasing mechanism, and a linear variable differential transformer (LVDT);

aligning the first datum with the first datum locator using at least one of the biasing mechanisms;

measuring at least one of the first, second, and third datum with the LVDT; and rotating the component about the first datum to align the second datum with the second datum locator using at least one of the biasing mechanisms.

2. A method in accordance with claim 1 wherein rotating the component about the first datum comprises biasing the component to rotate about the first datum the first biasing mechanism.

3. A method in accordance with claim 1 wherein aligning the first datum with the first datum locator comprises biasing the component against the first datum locator using the first biasing mechanism such that the first datum contacts the first datum locator and such that the component is rotatable about the first datum locator.

4. A method in accordance with claim 1 wherein rotating the component about the first datum comprises the second biasing mechanism to align the second datum with the second datum locator such that the second datum contacts the second datum locator.

5. A tool for aligning a component having at least a first datum and a second datum, said tool comprising:
- a fixture;
- a first and a second datum locator coupled to said fixture;
- a first biasing mechanism fixedly coupled to said fixture for biasing a component such that the component is aligned with respect to said first datum locator;
- at least one linear variable differential transformer (LVDT) base fixedly coupled to said fixture for measuring at least one component datum other than the component first datum; and
- a second biasing mechanism configured to bias the component against said second datum locator such that the second datum contacts said second datum locator.

6. A tool in accordance with claim 5 wherein said first biasing mechanism is configured to bias the component to rotate from an unaligned position wherein the first datum does not contact said first datum locator into an aligned position wherein the component first datum contacts said first datum locator and is aligned with respect to said first datum locator.

7. A tool in accordance with claim 6 wherein said second biasing mechanism is further configured to bias the component against said second datum locator such that the component is rotatable about said second datum locator.

8. A tool in accordance with claim 7 wherein at least one of said first biasing mechanism and said second biasing mechanism comprises a spring.

9. A tool in accordance with claim 7 wherein the component is a gas turbine engine blade including a dovetail portion, at least a portion of a profile of said second biasing mechanism shaped complementary with at least a portion of a profile of the dovetail portion such that at least a portion of the dovetail portion is sized to receive at least a portion of said second biasing mechanism therein.

10. A tool in accordance with claim 7 wherein said first and second biasing members configured to align the component in position within said fixture with respect to said first and second datum locators.

11. A tool in accordance with claim 5 wherein the component is a gas turbine engine blade including a tip shroud portion, at least a portion of a profile of said first biasing mechanism shaped complementary with at least a portion of a profile of the tip shroud portion such that at least a portion of the tip shroud portion is sized to receive at least a portion said first biasing mechanism therein.

12. A tool in accordance with claim 5 further comprising a linear variable differential transformer (LVDT) base fixedly coupled to said fixture and a LVDT slidably coupled to said LVDT base, said LVDT for measuring at least one datum other than said first datum.

13. A tool in accordance with claim 12 wherein said LVDT facilitates aligning the component with respect to said first datum locator.

14. An apparatus for aligning a gas turbine engine blade, wherein the blade includes a first datum, said apparatus comprising:
- a fixture;
- a first datum locator coupled to said fixture;
- a second datum locator coupled to said fixture;
- a first biasing mechanism fixedly coupled to said fixture for biasing the gas turbine engine blade such that the gas turbine engine blade rotates about said first datum locator;
- a second biasing mechanism for biasing the first datum into alignment with respect to said first datum locator such that the gas turbine engine blade is rotatable about said first datum locator.

15. An apparatus in accordance with claim 14 wherein the gas turbine engine blade includes a first and a second datum, said first biasing mechanism configured to bias the gas turbine engine blade to rotate from an unaligned position, wherein the first datum contacts and is aligned with respect to said first datum locator and the second datum does not contact said second datum locator, to an aligned position wherein the second datum contacts said second datum locator and is aligned with respect to said second datum locator.

16. An apparatus in accordance with claim 15 wherein at least a portion of at least one of said first and second biasing mechanisms sized to receive at least a portion of the gas turbine engine blade therein.

17. An apparatus in accordance with claim 15 also comprising a linear variable differential transformer (LVDT) base fixedly coupled to said fixture and a LVDT slidably coupled to said LVDT base, said LVDT facilitating alignment of the second datum with respect to said second datum locator.

18. An apparatus in accordance with claim 14 wherein said first datum locator at least partially convex.

* * * * *